United States Patent [19]

Nishikawa et al.

[11] Patent Number: 5,619,494

[45] Date of Patent: *Apr. 8, 1997

[54] ACCESS UNIT FOR LOCAL AREA NETWORK AND CONCENTRATOR SYSTEM THEREOF

[75] Inventors: Toshiyuki Nishikawa; Hiroshi Ishihara, both of Hyogo-ken, Japan

[73] Assignee: Mitsubishi Cable Industries, Ltd., Hyogo-ken, Japan

[*] Notice: The portion of the term of this patent subsequent to Jan. 12, 2000, has been disclaimed.

[21] Appl. No.: 306,521

[22] Filed: Sep. 15, 1994

Related U.S. Application Data

[63] Continuation of Ser. No. 700,751, May 15, 1991, abandoned.

[30] Foreign Application Priority Data

May 18, 1990 [JP] Japan ................................. 2-129910

[51] Int. Cl.$^6$ .............................. H04L 12/42; H04L 12/40
[52] U.S. Cl. ..................... 370/357; 340/895.05; 333/105
[58] Field of Search ............................... 370/85.5, 85.12, 370/85.13, 85.14, 85.15, 56, 825.05, 85.1, 85.3, 85.4; 340/825.05, 825.06, 825.07, 825.52, 825.5; 307/112, 115, 96, 98, 139

[56] References Cited

U.S. PATENT DOCUMENTS

| | | | |
|---|---|---|---|
| 3,581,010 | 5/1971 | Kobayashi et al. | 370/105 |
| 4,417,242 | 11/1983 | Bapst et al. | 340/825.05 |
| 4,701,630 | 10/1987 | Annunziata et al. | 307/112 |
| 4,733,153 | 3/1988 | Katzenstein | 320/1 |
| 4,862,158 | 8/1989 | Keller et al. | 340/825.05 |
| 4,935,926 | 6/1990 | Herman | 370/85.13 |
| 5,034,738 | 7/1991 | Ishihara et al. | 370/85.15 |
| 5,101,405 | 3/1992 | Bekki et al. | 370/85.15 |
| 5,179,291 | 1/1993 | Nishikawa et al. | 370/85.15 |

*Primary Examiner*—Wellington Chin
*Assistant Examiner*—Ajit Patel

[57] ABSTRACT

The single port of a concentrator is branched into a plurality of ports by connecting a connector for the former-stage connector to the port of the concentrator and connecting the former-stage connector of the same structure in the other access unit to the connector for the latter-stage circuit to thereby cascade a plurality of access units. The LAN is expanded by connecting the workstation to the port connector of each of the cascaded access units. The thus, connected workstations provide an overlap signal of an AC signal and a DC signal. DC signal extraction circuit in the access unit extracts the DC signal from the overlap signal. A relay drive circuit is operated by the DC signal so that a relay is switched to the port connector side and the circuit is then connected to the workstation.

8 Claims, 7 Drawing Sheets

Prior Art

ACCESS UNIT FOR LOCAL AREA NETWORK AND CONCENTRATOR SYSTEM THEREOF

This application is a continuation of application Ser. No. 07/700,751 filed on May 15, 1991, now abandoned.

CROSS REFERENCE TO RELATED APPLICATION

This application is related to U.S. Ser. No. 07/591,813 now U.S. Pat. No. 5,179,291 (BSKB Ref No. 369-155P) entitled, "ACCESS UNIT FOR LOCAL AREA NETWORK", and filed in the names of T. Nishikawa et al on Oct. 2, 1990, and is assigned to the assignee of this invention. Furthermore, the subject matter of U.S. Ser. No. 07/591,813 is meant to be specifically incorporated herein by reference.

BACKGROUND OF THE INVENTION

1. Field of the Invention

The present invention relates to an access unit used for branching ports of a concentrator forming a local area network (LAN) with loop topology in conjunction with a plurality of workstations such that desired number of workstations can be additionally connected, and a concentrator system using the access unit.

2. Prior Art

Figure 7:
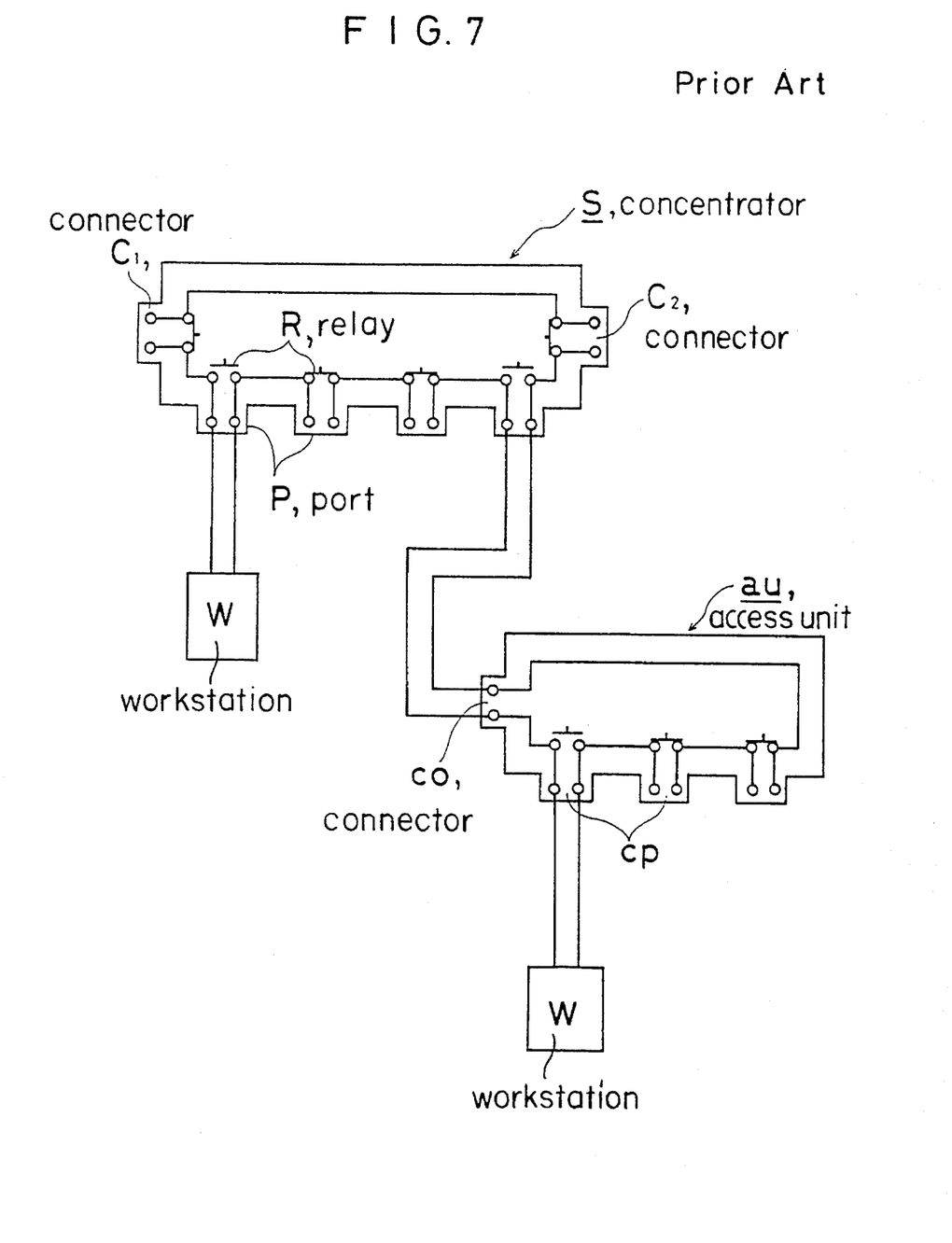
FIG. 7 is a construction of the LAN comprising a conventional access unit.

FIG. 7 shows a conventional LAN comprising a conventional access unit. In the conventional LAN of FIG. 7, a concentrator S comprises four ports P one or all of which a workstation W is connected to in order to form a local area network with loop topology (LAN). Connectors $C_1$ and $C_2$ are provided for coupling another concentrator.

A relay R is incorporated within each of the ports P for the workstation W. When the workstation W is connected to the port P, the relay R is switched to open the circuit and switch the circuit to the workstation W side. When the workstation W is removed, the circuit is closed. Therefore, the workstation W is inserted and removed from the LAN within the limitation of the number of the ports P of the concentrator S.

In case where the workstation W is positioned at a location distant from the location where the concentrator S is installed, it is troublesome to provide the cable. When the number of the workstations W is large, the wiring becomes complex.

Since the number of the ports P in the concentrator S is limited, it is difficult to expand the number of the workstations W over the number of the ports P. Thus, it may be difficult to sufficiently meet with the requirement when the LAN is to be expanded. Conventionally, an access unit au as shown in FIG. 7 is used. The access unit is a kind of branching device conneted to one of the ports P in the concentrator S. The access unit au comprises a connector co connected to the port P in the concentrator S and a plurality (three in FIG. 6) of port connectors cp for the workstation W. The provision of the access unit au enables the number of the workstations W connectd to the concentrator S to increase in order to expand the LAN. Further, a single cable can be enough from the access unit au to the concentrator S, so that it is unnecessary to couple the workstations W individually to the concentrator S, which is not troublesome.

However, in the conventional access unit au, the number of the ports P is limited to a predetermined number, for example, 4, it is not easily possible to freely alter the number of the branching ports which is not able to expansion.

Conventionally, even if a single workstation W is added, the access unit au having a plurality of (normally, four) ports is used, which is not cost-effective. In addition, in the port P of the concentrator S connected to the access unit au, the circuit of the concentrator S must be open and connected to the circuit of the access unit au. In short, the circuits need to be switched over the two stages. Conventionally, it has been proposed that power energy is supplied from the connecting workstation W to the access unit au for supporting circuit switching. However, this system needs individual power lines to the workstation W and the access unit au, respectively. Then, the structures of the cables and the connectors are different from the general types for data transmission, which is not in practise.

SUMMARY OF THE INVENTION

With the foregoing in mind, it is an object of the present invention to provide an improved local area network (LAN) for expanding the number of the branching ports at a single unit, so that the expansion of the LAN is freely possible to any desired number without any waste and that circuit switching is possible at two stages without any necessity of an additional power source.

Briefly described, in accordance with the present invention, an access unit comprises a first connector for a former-stage circuit i.e. a circuit preceding a workstation, a second connector for a latter-stage circuit i.e. a circuit subsequent the workstation, a single port or third connector for the workstation, a relay, a transformer, a DC signal extraction circuit, a relay drive circuit, and a constant-current circuit. The connector for the latter-stage circuit mechanically makes the latter stage circuit the last stage in absence of any subsequent latter-stage circuit being connected to the first mentioned latter stage circuit. The relay is positioned between the first connector and the second connector, and switches the circuit into the third or port connector side. The transformer is coupled between the port connector and the relay and passes an AC signal only from a composite signal generated by adding a DC signal into the AC signal for data transmission transmitted from the workstation to thereby supply the AC signal to the circuit. The DC signal extraction circuit is coupled between the port connector and the transformer and extracts the DC signal from the composite signal suplied from the workstation.

The relay drive circuit sets or resets the relay in response to the DC signal extracted by the DC signal extraction circuit. The constant current circuit is provided for keeping the value of the current within a predetermined range. The transformer operates to generate the DC signal.

In another preferred embodiment of the present invention, an access unit comprises a connector for a former-stage circuit, another connector for a latter-stage circuit, a single port connector for a workstation and, a relay between the two connectors for switching the circuit into the port connector side.

A concentrator is provided for switching so as to join a workstation in a LAN. Means is provided responsive to the connection of a new workstation to the single port connector of the access unit for enabling the new workstation to be connected to the concentrator in order to provide a LAN system.

With the above-described arrangement, the single port of the concentrator is branched into a plurality of ports by connecting the connector for a former-stage connector to the port of the same concentrator and connecting a former-stage connector of the structure in the other access unit to a connector for the latter-stage circuit to thereby cascade a plurality of access units. The LAN is expanded by connecting the workstation to the port connector of each of the cascaded access units. The thus connected workstations provide the composite signal of the AC signal and the DC signal.

The DC signal extraction circuit in the access unit extracts the DC signal from the composite signal. The relay drive circuit is operated by the DC signal so that the relay is switched to the port connector side and the circuit is then connected to the workstation.

The transformer passes the DC signal component only from the signal transmitted from the workstation. The transformer combines the DC signal, again.

The composite signal is supplied to the ports of the concentrator through the circuit. In the ports of the concentrator, the relay is switched in response to the DC signal in the input signal to connect the circuit in the concentrator to the access unit side.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
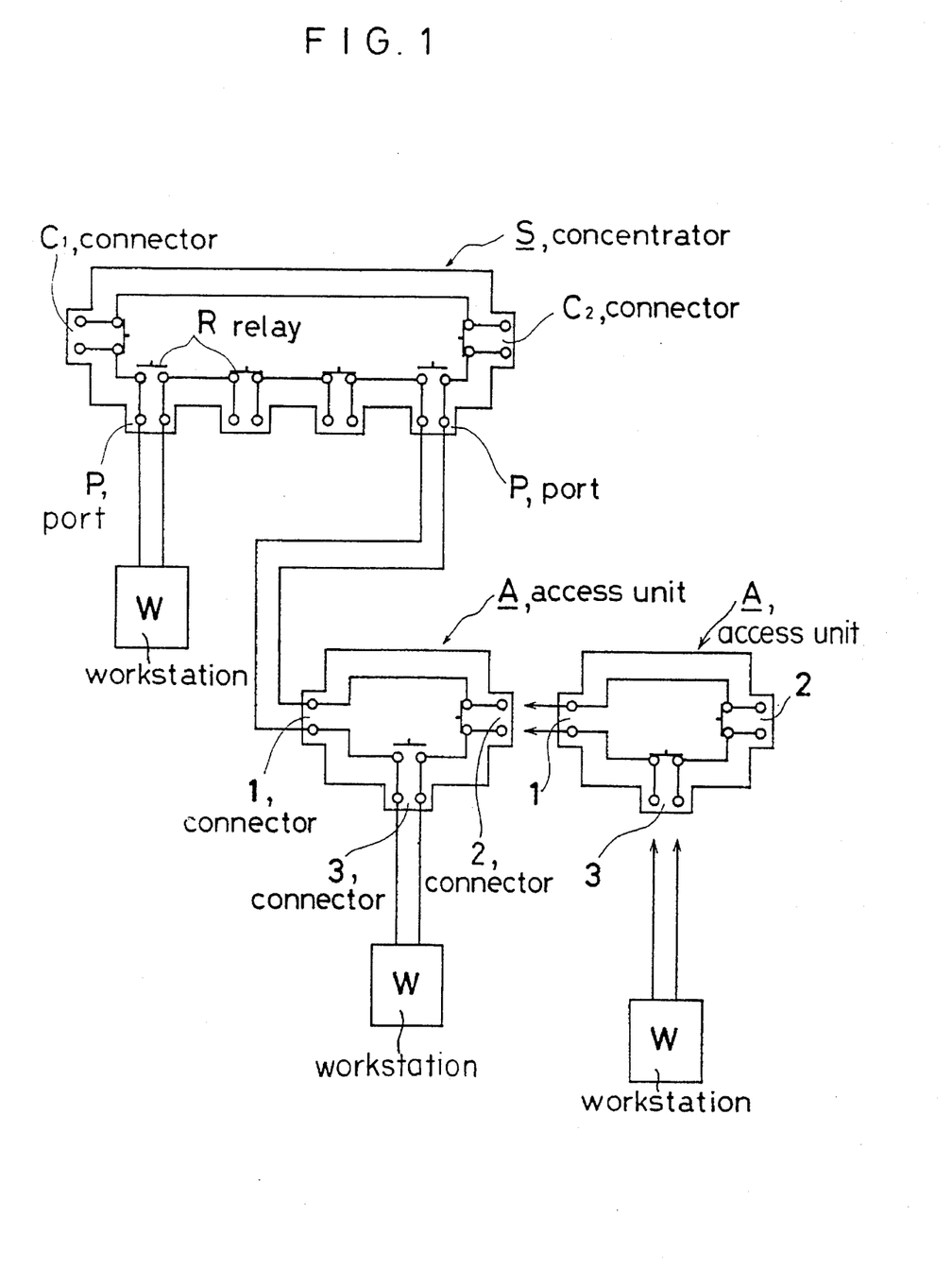
FIG. 1 is a construction of the LAN comprising an access unit of the present invetnion.

FIG. 1 is a construction of the LAN comprising an access unit of the present invention. In FIG. 1, the LAN comprises a concentrator S, an access unit A of the present invention, and a workstation W.

The construction of the concentrator S is conventional and comprises a plurality of (four in FIG. 4) ports for workstations, and connectors $C_1$ and $C_2$ for connecting the other concentrators.

The access unit A comprises a connector 1 for a circuit preceding a workstation, hereinafter referred to as the former-stage circuit, another connector 2 for a circuit subsequent the workstation, hereinafter referred to as the latter-stage circuit, and a single port connector 3 for a workstation W.

The connector 1 for the former-stage circuit can be connected to the port P of the concentrator S, or the connector 2 for the latter-stage circuit in the other access unit A of the same construction. The connector 2 for the latter-stage circuit, therefore, can be connected to the connector 1 for the former-stage circuit of the other access unit A of the same construction. As long as no other connector, another connector 1, for example, is connected from the latter-stage circuit, the connector 2 for the latter-stage circuit mechanically closes the circuit as the last stage. As long as a connector is connected from the latter-stage circuit, the connector 2 connects the circuit to the latter-stage circuit. When the connector is removed, the connector 2 closes the circuit as the last stage, again.

The port connector 3 forms a single port for a workstation. Here, one workstation W is connectable to the access unit A. The workstation W transmits a composite signal of an AC signal for data transmission added by a DC signal for driving a relay.

Figure 2:
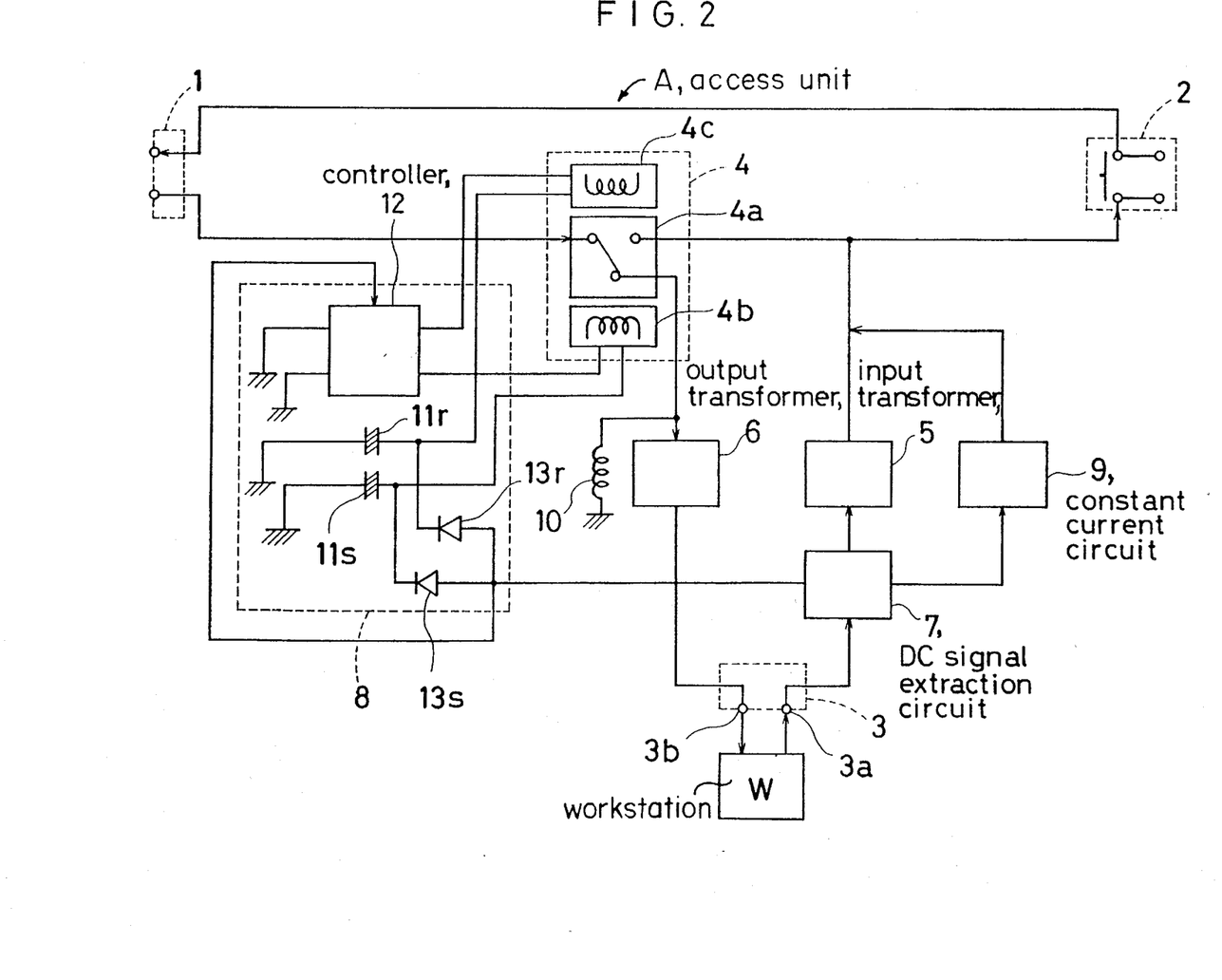
FIG. 2 is a block diagram of the access unit of the present invention.
Figure 3:
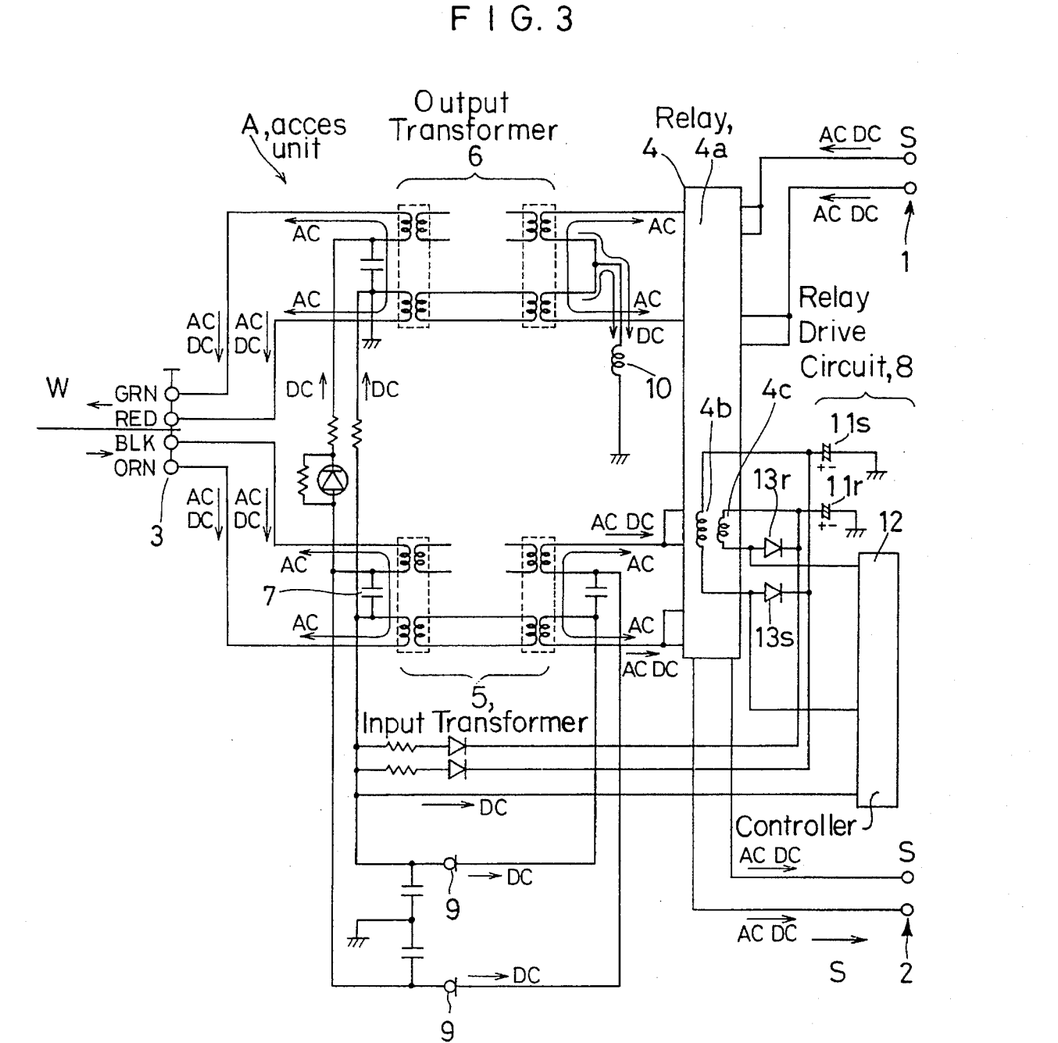
FIG. 3 is a more detailed circuit diagram of the access unit.

FIGS. 2 and 3 show the circuit details in the access unit. As shown in FIGS. 2 and 3, the access unit A having the above-mentioned former-stage connector 1, the latter-stage connector 2, the port connector 3 further comprises a relay 4, two transformers 5 and 6, a DC signal extraction circuit 7, a relay drive circuit 8, and a constant current circuit 9. The relay 4 is a latch type relay for switching the circuit between the former-stage connector 1 and the latter-stage connector 2 into the side of the port connector 3. The relay 4 has a relay terminal 4a, a set coil 4b and a reset coil 4c.

The transformers 5 and 6 are provided between the circuit and the respective terminals 3a and 3b of the port connector 3. The input transformer 5 corresponding to the input terminal 3a of the port connector 3 extracts the AC signal component from the composite signal derived from the workstation W and supplies the extracted AC signal to the circuit side. The output transformer 6 corresponding to the output terminal 3b of the port connector 3 extracts the DC signal component from the composite signal derived from the circuit. A coil 10 is provided for eliminating the DC signal, at the primary winding of the output transformer 6 (at the side of the relay 4).

The DC signal extraction circuit 7 is interposed between the input terminal 3a of the port connector 3 and the input transformer 5. The DC signal extraction circuit 7 operates to extract the DC signal component from the composite signal derived from the workstation W.

The relay drive circuit 8 causes the relay 4 to be set or reset according to the DC signal exctracted by the DC signal extraction circuit 7. The relay drive circuit 8 comprises a pair of a set-purpose condenser $11s$ and a reset-purpose condenser $11r$ both charged by the DC signal derived by the DC signal extraction circuit 7, and a controller 12 responsive to the DC signal for supplying the charging charges of one of the condensers $11s$ and $11r$ to the set coil $4b$ and the reset coil $4c$, respectively. The controller 12 includes an RC time constant circuit for controlling to wait until the two condensers $11s$ and $11r$ are enough charged. Reverse-current protection diodes $13s$ and $13r$ are connected at the former-stage of the condensers $11s$ and $11r$.

The constant current circuit 9 is provided for keeping the value of the current within a predetermined range. The constant current circuit 9 is provided such that whenever the DC signal contained within the composite signal from the workstation W is transmitted either to the subsequent workstation W or the concentrator S, the input resistor detected from the workstation W is made constant. The transformer operates to combine the DC signal.

With the above-mentioned circuit arangement, to expand the LAN with the access unit A of the present invention, the connector 1 for a former-stage circuit of a first access unit A is connected to anyone of the ports of the concentrator S. The connector 1 for the former-stage circuit of a second access unit A is connected to the connector 2 for a latter-stage circuit of the first access unit A. Thus, to the single port P of the concentrator S, a plurality of access units (two in FIG. 1) are connected in series with each other. The workstation W is connected to each of the port connectors 3 of the access units A. Thus, an expanded LAN is structures comprising the workstation connected to the port P of the concentrator S and the workstation W connected to the port connector 3 of the access unit A.

Now, the inner operation of the access unit A will be described. As long as no workstation W is connected to the port connector 3, the relay 4 is reset so that the inner circuit of the access unit A is closed.

In such a case, as long as no additional access unit A is connected at the latter-stage of said access unit A, the circuit of the access unit A is ended at the connector 2 for the latter-stage circuit. On the other hand, when an additional access unit A is connected at the latter-stage, the circuit of the access unit A and the circuit of the additional are connected to each other, so that the circuit is ended at the connector 2 for the latter-stage circuit of the last stage access unit A.

Under the circumstances, when the workstation W is connected to the port connector 3, the composite signal is inputted from the workstation W to the input terminal 3a of the port connector 3. The DC signal component in the composite signal is extracted by the DC signal extraction circuit 7 to be applied to the relay drive circuit 8 and the constant current circuit 9.

In the relay drive circuit 8, the two condensers 11s and 11r are charged with the DC signal. Once these condensers 11s and 11r are sufficiently charged, the controller 12 operates to input the charging current of the set-purpose condenser 11s to the set coil 4b of the relay 4. Then, the relay terminal 4a is switched to the side of the port connector 3, so that the workstation W is connected to the circuit of the access unit A.

The DC signal extracted by the DC signal extraction circuit 7 passes through the constant current circuit 9 and is applied to the secondary winding of the input transformer 5. At the secondary winding of the input transformer 5, the AC signal component by removing the DC signal component from the composite overlap signal is added with the AC signal component to provide a new composite signal. Thus, the composite signal flows through the circuit of the access unit A. The composite signal flowing through the circuit of the access unit A is supplied to the port P of the concentrator S. At the port P of the concentrator S, the DC signal in the overlap signal from the access unit A opens the circuit to the side of the access unit A. Since every port P of the concentrator S comprises a relay, a relay drive circuit, a transformer, and a DC signal extraction circuit as described in the port of the access unit A, these circuit elements serve to extract the DC signal component from the composite signal from the access unit A, so that the relay R is energized to switch the circuit to the side of the access unit A.

When the workstation W is removed from the port connector 3 of the access unit A, the controller 12 of the relay drive circuit 8 does not receive the DC signal. Responsive to it, the controller 12 supplies the current, which has been used to charge to the reset-purpose condenser 11r, to the reset-purpose coil 4c to reset the relay 4. The circuit is thus closed.

As long as the workstation W is connected to one of the cascaded access units A, the workstation W provides the circuit of the access unit A with the composite signal, so that the port P of the concentrator S maintains the circuit connection to the access unit A. When all of the workstations are removed from the access unit A, no composite signal is supplied to the port P of the concentrator S at the time when the last workstation W is removed, so that the circuit of the concentrator S is closed to the access unit A.

Figure 4:
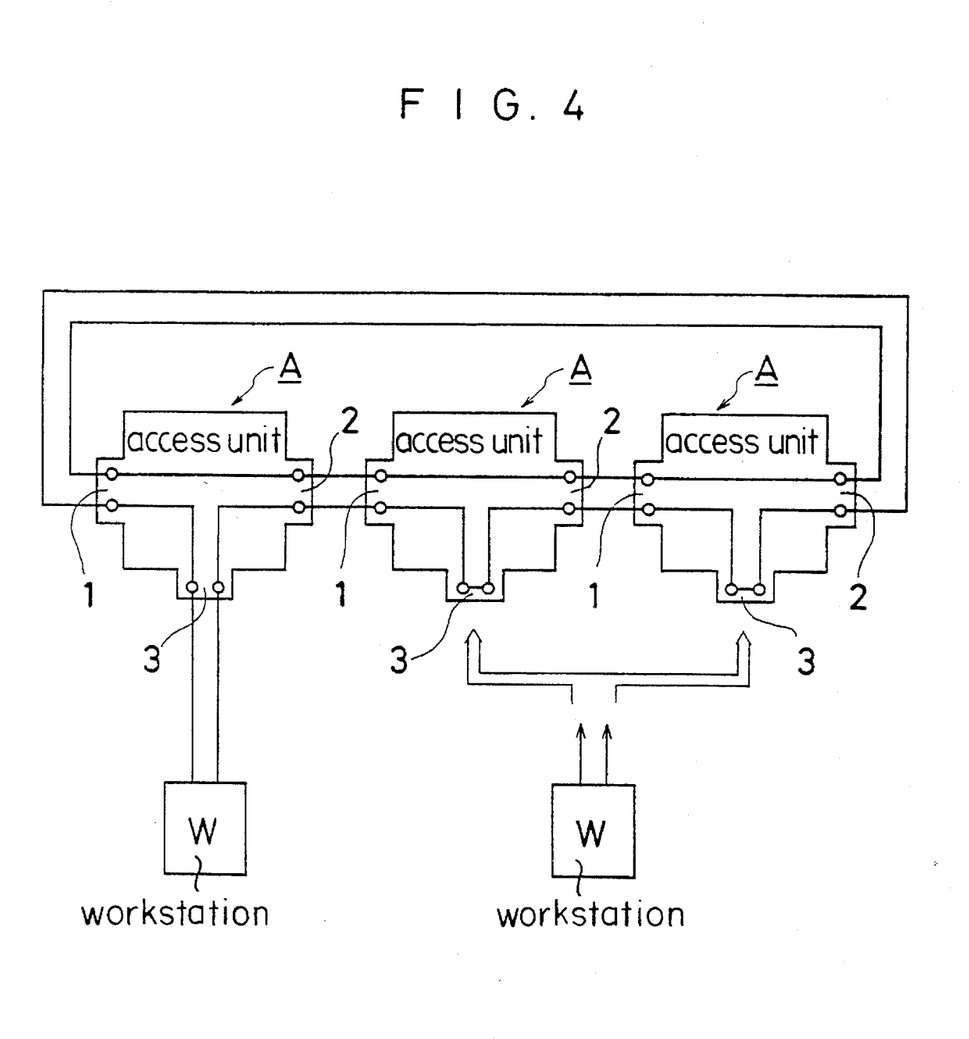
FIGS. 4 through 6 are the constructions of the LANs according to the other preferred embodiments, comprising the access unit of the present invention.
Figure 5:
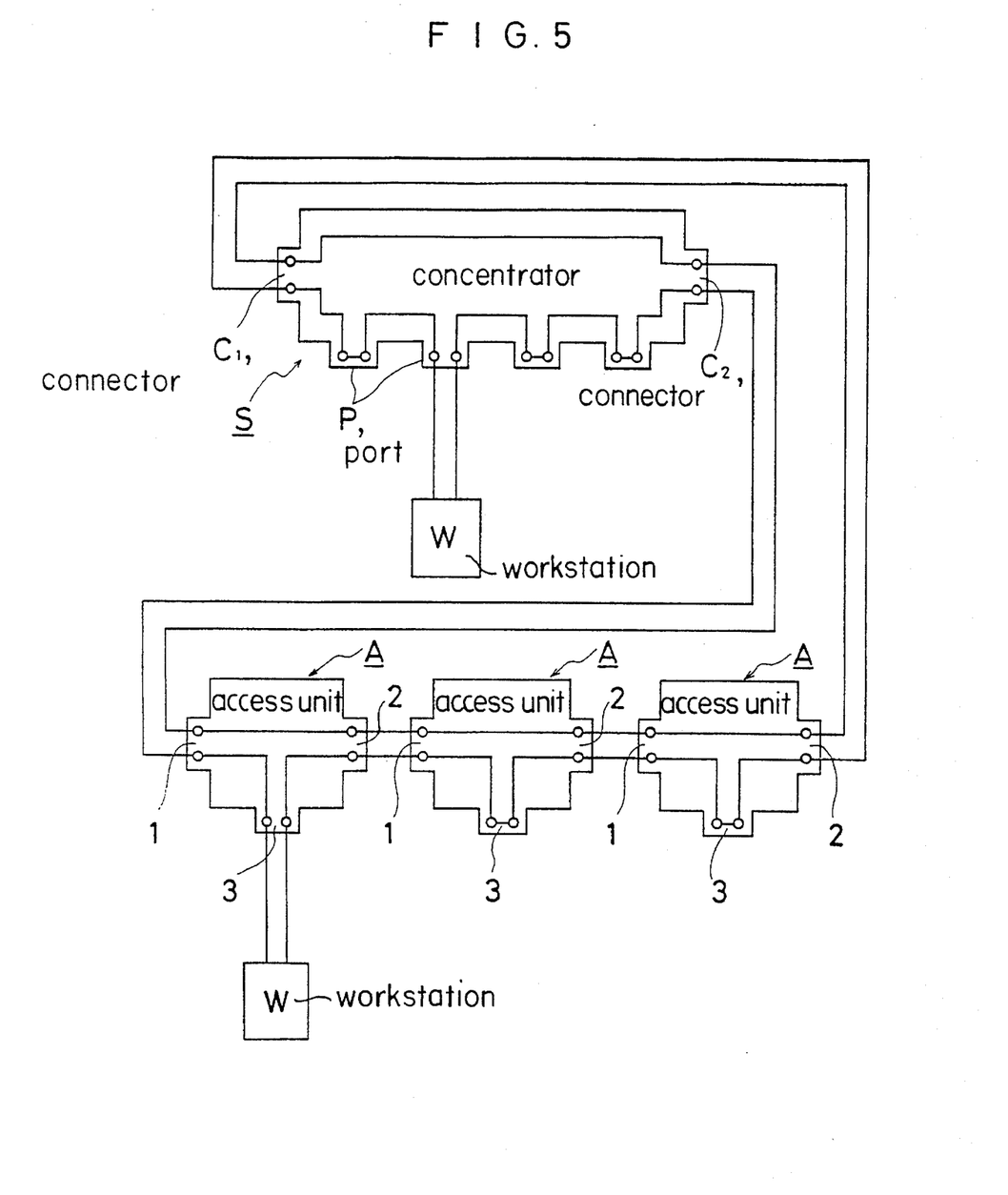
Figure 6:
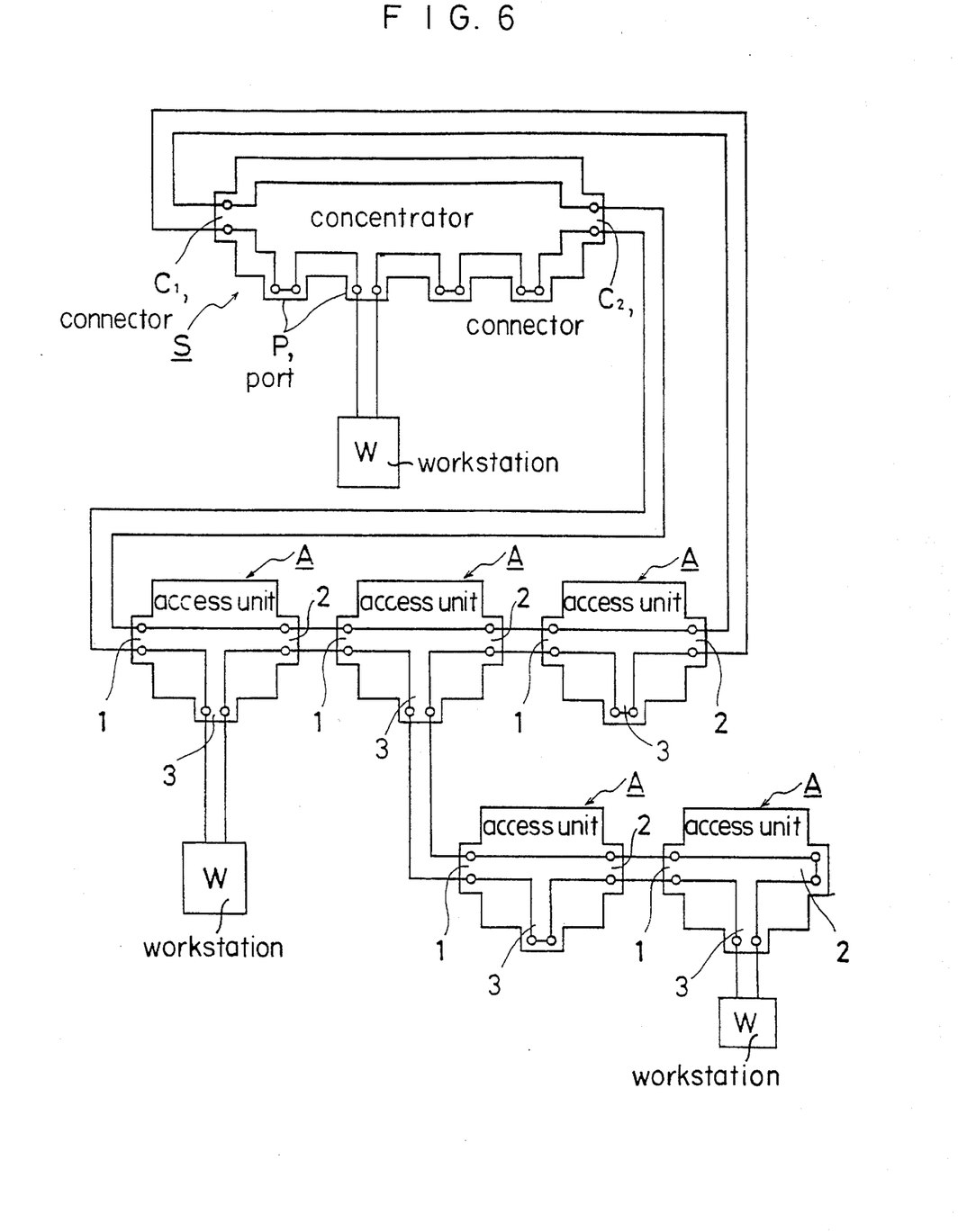

FIGS. 4 through 6 show other LAN systems according to the preferred embodiments using the access unit of the present invention. In the LAN system as shown in FIG. 4, a concentrator is not provided but a plurality of access units A (three in FIG. 4) are cascaded such that the connector 1 for the former-stage circuit of the first stage access unit A is connected to the connector 2 for the latter-stage circuit of the last stage access unit A. Such an arrangement enables the access units A to function as the concentrator so that the circuit is a double loop and a loop in which a workstation W is not connected is a back up loop.

In the LAN system of FIG. 5, the plurality of access unit A are cascaded one after another such that the connector 1 for the former-stage circuit of the first stage access unit A is connected to the connector C2 for the latter-stage circuit of the concentrator S, and the connector 2 for the latter-stage connector of the last stage access unit A is conneted to the connector C1 for the former-stage circuit of the concentrator S. This arrangement enables the access units A to also function as the concentrator.

In the LAN system of FIG. 6, the plurality of access units A are cascaded such that the connector 1 for the former-stage circuit of the access unit A is connected to the port connector 3 of another access unit A functioning as the concentrator and the connector 1 for the former-stage circuit of said another access unit A is connected to the connector 2 for the latter-stage circuit of the access unit A. Thus, the port of the access unit A functioning as the concentrator is branched to a plurality of ports.

As described above, according to the present invention, a desired number of access units are cascaded to the port of the concentrator to provide a necessary number of ports of the workstations, so that the LAN can be expanded freely and up to a desired scale without any waste. Since the composite signal of the DC signal and the AC signal for data transmission is transmitted from the workstation and the DC signal in the composite signal activates the relay for switching the circuit of the access unit and the relay in the concentrator, so that no additional power line is required for switching the circuit at the two stages and the conventional data transmission cable and connector can be used which is easily in practice.

While only certain embodiments of the present invention have been described, it will be apparent to those skilled in the art that various changes and modifications may be made therein without departing from the spirit and scope of the present invention as claimed.

What is claimed is:

1. An access unit for a local area network comprising:

first circuit means including a first connector preceding a workstation for coupling to a circuit preceding said access unit;

second circuit means including a second connector subsequent said workstation for mechanically closing said second circuit means so as to make the access unit a last stage circuit in absence of a circuit subsequent said access unit;

a third connector for said workstation coupled between said first and second circuit means, said third connector further comprising a port connector;

a relay coupled to said third connector for selectively connecting and disconnecting the workstation between said first and second circuit means;

a transformer coupled between said third connector and said relay for passing only an AC signal from a composite signal generated by adding a DC signal to the AC signal for data transmission transmitted from the workstation to thereby supply the AC signal to the first and second circuit means including the first and second connectors;

a DC signal extraction circuit coupled between said third connector and said transformer for extracting the DC signal from the composite signal transmitted from the workstation;

a relay drive circuit for setting or resetting said relay in response to the DC signal extracted by said DC signal extraction circuit; and a constant current circuit for maintaining the DC signal extracted by said DC signal extraction circuit within a predetermined range.

2. The access unit as set forth in claim 1, further comprising a second transformer coupled between said third connector and said relay for passing only the AC signal from a composite signal for data transmission in said first and second circuit means and generated by adding a DC signal to the AC signal.

3. The access unit as set forth in claim 1, wherein said relay drive circuit comprises a pair of condensers, a relay setting condenser and a relay resetting condenser, both being charged by the DC signal from said DC signal extraction circuit and further comprising a controller responsive to the DC signal for selectively supplying the charge to said condensers to either energize a set coil or a reset coil of said relay.

4. The access unit as set forth in claim 3, wherein said controller comprises an RC time constant circuit.

5. An access unit coupled to a workstation in a local area network system, comprising:

a first connector connectable to circuit means preceding a workstation, a second connector connectable to circuit means subsequent said workstation, a third connector comprising a single port connector for said workstation connectable between said first and second connectors, a set of relay contacts of an electrically energizable relay coupled across said third connector, said set of relay contacts being switchable from a closed state to an open state in response to a detachable interconnection of said workstation to said third connector, and a mechanically operated electrical switch coupled across said second connector and between said first connector and said set of relay contacts, said electrical switch being switchable from a closed state to an open state in response to a detachable interconnection thereto of said circuit means subsequent said workstation and thereby switching said circuit means preceding said workstation and said circuit means subsequent said workstation into circuit relationship with said workstation, said switch being in said closed state in absence of said circuit means subsequent said workstation for switching said workstation into circuit relationship only with said circuit means preceding said workstation through said first connector.

6. A concentrator system for a local area network system coupled to at least one workstation, comprising:

at least one access unit including, a first connector connectable to circuit means preceding a workstation, a second connector connectable to circuit means subsequent said workstation, a third connector comprising a single port connector for said workstation connectable between said first and second connectors, a set of relay contacts of an electrically energizable relay coupled across said third connector, said set of relay contacts being switchable from a closed state to an open state in response to a detachable interconnection of said workstation to said third connector, and a mechanically operated electrical switch coupled across said second connector and between said first connector and said set of relay contacts, said electrical switch being switchable from a closed state to an open state responsive to a detachable interconnection thereto of said circuit means subsequent said workstation for switching said circuit means preceding said workstation and said circuit means subsequent said workstation into circuit relationship with said workstation, said switch being in said closed state in absence of said circuit means subsequent said workstation for switching said workstation into circuit relationship only with said circuit means preceding said workstation through said first connector;

said circuit means preceding said workstation including a concentrator, said concentrator further comprising an input connector, an output connector, means connecting one side of said connectors together, and a plurality of intermediate single input ports having respective sets of relay contacts coupled thereacross, all of said relay contacts being switched to a closed state so as to be connected in series between the other side of said connectors when all of said ports are open, and respectively switching from said closed state to an open state when one of said ports is detachably connected to another access unit or another workstation.

7. A concentrator system in accordance with claim 6 wherein said input connector and said output connector additionally include a respective normally closed mechanically operated electrical switch coupled thereacross to form a closed loop interiorally of said concentrator in absence of external circuit means being interconnected therewith and switching to an open state when an external circuit means is respectively detachably connected thereto.

8. A concentrator system for a local area network system comprising:

a plurality of cascaded access units each including, a first connector connectable to a circuit preceding a workstation, a second connector connectable to a circuit subsequent said workstation, a third connector connectable to said workstation, a set of electrically energizable relay contacts coupled across said third connector and being switchable from a closed state to an open state in response to a detachable interconnection of said workstation to said third connector, and a mechanically operated switch coupled across said second connector and between said first connector and said set of relay contacts and being switchable from a closed state to an open state in response to detachable interconnection thereto of a said first connector of a subsequent access unit and switching from said open state to said closed state for switching said workstation into circuit relationship only with said circuit means preceding said workstation through said first connector in absence of a subsequent access unit;

a concentrator comprising an input connector, an output connector, means connecting one side of said connectors together, and a plurality of intermediate single input ports having respective sets of relay contacts coupled thereacross, all of said relay contacts being switched to a closed state so as to be connected in series between the other side of said connectors when all of said ports are open, and respectively switching from said closed state to an open state when one of said ports is detachably connected to another access unit or another workstation; and wherein said first connector of a first stage access unit of said plurality of access units is connected to said output connector of said concentrator and wherein said second connector of a last stage access unit is connected to input first connector of said concentrator.

* * * * *

UNITED STATES PATENT AND TRADEMARK OFFICE
CERTIFICATE OF CORRECTION

PATENT NO.   : 5,619,494
DATED        : April 8, 1997
INVENTOR(S)  : Nishikawa et al.

It is certified that error appears in the above-indentified patent and that said Letters Patent is hereby corrected as shown below:

On the title page:

In the [*] Notice: section on the face of the patent, change "Jan. 12, 2010"

Signed and Sealed this

Nineteenth Day of October, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO.   : 5,619,494
DATED        : April 8, 1997
INVENTOR(S)  : Nishikawa et al.

It is certified that error appears in the above-identified patent and that said Letters Patent is hereby corrected as shown below:

<u>Title page,</u>
In the [*] Notice: section change "Jan. 12, 2000" to -- Oct. 2, 2010 --.

This certificate supersedes Certificate of Correction issued October 19, 1999.

Signed and Sealed this

Fifteenth Day of January, 2002

Attest:

JAMES E. ROGAN
*Director of the United States Patent and Trademark Office*

*Attesting Officer*